US009275423B2

(12) United States Patent
Seo et al.

(10) Patent No.: US 9,275,423 B2
(45) Date of Patent: Mar. 1, 2016

(54) RIGHT OBJECT RENEWAL METHOD AND APPARATUS FOR RIGHT-PROTECTED BROADCAST SERVICE

(71) Applicant: Samsung Electronics Co., Ltd., Gyeonggi-do (KR)

(72) Inventors: Jeong Wook Seo, Daegu (KR); Je Geol Lee, Gyeonggi-do (KR); Chung Kyu Lee, Seoul (KR); Mi Sun Kim, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/324,695

(22) Filed: Jul. 7, 2014

(65) Prior Publication Data

US 2014/0317002 A1    Oct. 23, 2014

Related U.S. Application Data

(63) Continuation of application No. 12/555,890, filed on Sep. 9, 2009, now Pat. No. 8,774,401.

(30) Foreign Application Priority Data

Sep. 9, 2008    (KR) ........................ 10-2008-0088874

(51) Int. Cl.
*H04L 9/00* (2006.01)
*G06F 7/04* (2006.01)
(Continued)

(52) U.S. Cl.
CPC .............. *G06Q 50/184* (2013.01); *G06Q 10/00* (2013.01); *H04N 7/1675* (2013.01);
(Continued)

(58) Field of Classification Search
None
See application file for complete search history.

(56) References Cited

U.S. PATENT DOCUMENTS 6,510,513 B1    1/2003   Danieli
7,140,042 B2    11/2006  Verma
(Continued)

FOREIGN PATENT DOCUMENTS

KR    10-0759900 B1    9/2007
KR    10-0784049 B1    12/2007
(Continued)

OTHER PUBLICATIONS

"Mobile Broadcast Services Architecture"; Jun. 9, 2008; Candidate Version 1.0; Open Mobile Alliance Ltd.
(Continued)

*Primary Examiner* — Jason K. Gee
*Assistant Examiner* — Olanrewaju Bucknor
(74) *Attorney, Agent, or Firm* — Cha & Reiter, LLC

(57) ABSTRACT

A Right Object renewal method and apparatus for a right-protected digital broadcast service that is capable of predicting the expiration of a Right Object issued for the right-protected broadcast channel and renewing the Right Object prior to the expiration of the Right object based on the predicted expiry is provided. A right object renewal method for a right-protected broadcast service using a long term right object having a purchased license duration and a short term right object having a temporary license duration which is shorter than the purchased license duration according to the present invention includes determining whether the time to expire of a previously issued short term right object is less than a predetermined threshold value; requesting, when the time to expire of the previously issued short term right object is less than the threshold value, requesting and receiving a new short term object; and renewing the duration of the short term right object based on the received new short term right object.

10 Claims, 5 Drawing Sheets

(51) Int. Cl.
  *G06Q 50/18* (2012.01)
  *H04N 7/167* (2011.01)
  *H04N 21/254* (2011.01)
  *H04N 21/414* (2011.01)
  *H04N 21/4627* (2011.01)
  *H04N 21/6334* (2011.01)
  *H04N 21/835* (2011.01)
  *H04N 21/8355* (2011.01)
  *G06Q 10/00* (2012.01)

(52) U.S. Cl.
  CPC .... *H04N 21/2541* (2013.01); *H04N 21/41407* (2013.01); *H04N 21/4627* (2013.01); *H04N 21/6334* (2013.01); *H04N 21/835* (2013.01); *H04N 21/8355* (2013.01)

(56) References Cited

U.S. PATENT DOCUMENTS

| | | | |
|---|---|---|---|
| 7,181,761 B2 | 2/2007 | Davis et al. | |
| 7,284,263 B2 | 10/2007 | Davis et al. | |
| 7,483,860 B2 | 1/2009 | Cronce et al. | |
| 8,224,752 B2 * | 7/2012 | Read et al. | 705/59 |
| 8,386,303 B2 | 2/2013 | McKinney | |
| 8,429,082 B1 * | 4/2013 | Biswas et al. | 705/59 |
| 8,473,756 B2 | 6/2013 | Orsini et al. | |
| 8,660,961 B2 * | 2/2014 | Raley et al. | 705/51 |
| 2002/0002466 A1 * | 1/2002 | Kambayashi et al. | 705/1 |
| 2003/0033601 A1 * | 2/2003 | Sakata | H04N 7/163 725/29 |
| 2003/0135756 A1 | 7/2003 | Verma | |
| 2003/0172035 A1 | 9/2003 | Cronce et al. | |
| 2004/0102987 A1 | 5/2004 | Takahashi et al. | |
| 2005/0107035 A1 * | 5/2005 | Zoeckler | H04H 20/57 455/12.1 |
| 2005/0155079 A1 * | 7/2005 | Chen | H04N 7/17318 725/115 |
| 2005/0216418 A1 | 9/2005 | Davis et al. | |
| 2006/0242073 A1 * | 10/2006 | Padawer et al. | 705/51 |
| 2007/0011750 A1 | 1/2007 | Davis et al. | |
| 2007/0162399 A1 | 7/2007 | Medvinsky et al. | |
| 2007/0189535 A1 | 8/2007 | Lee et al. | |
| 2007/0265976 A1 * | 11/2007 | Helfer et al. | 705/59 |
| 2008/0071688 A1 * | 3/2008 | Corbett et al. | 705/59 |
| 2008/0104539 A1 * | 5/2008 | Ikeda | H04N 7/165 715/808 |
| 2008/0120708 A1 | 5/2008 | Waisbard et al. | |
| 2008/0222044 A1 * | 9/2008 | Gottlieb | G06F 21/10 705/59 |
| 2008/0307533 A1 * | 12/2008 | Hanai | G06F 21/10 726/30 |
| 2009/0055933 A1 | 2/2009 | Samuel | |
| 2009/0055937 A1 | 2/2009 | Samuel | |
| 2009/0055938 A1 | 2/2009 | Samuel | |
| 2009/0326964 A1 | 12/2009 | Garg et al. | |
| 2010/0049989 A1 | 2/2010 | Lee | |
| 2010/0268621 A1 * | 10/2010 | Takechi | G06F 21/10 705/26.1 |

FOREIGN PATENT DOCUMENTS

| | | |
|---|---|---|
| KR | 10-2008-0072338 A | 8/2008 |
| WO | 2006/048856 A1 | 5/2006 |
| WO | 2007/089092 A1 | 8/2007 |

OTHER PUBLICATIONS

"Service and Content Protection for Mobile Broadcast Services"; Aug. 26, 2008; Draft Version 1.0; Open Mobile Alliance Ltd.

"OMA DRM v2.0 Extensions for Broadcast Support"; Feb. 12, 2009; Approved Version 1.0; Open Mobile Alliance Ltd.

* cited by examiner

RIGHT OBJECT RENEWAL METHOD AND APPARATUS FOR RIGHT-PROTECTED BROADCAST SERVICE

CROSS RELATED APPLICATIONS

This application is a Continuation of U.S. patent application Ser. No. 12/555,890 filed on Sep. 9, 2009 which claims the benefit of the earlier filing date, pursuant to 35 USC 119, to that patent application entitled "RIGHT OBJECT RENEWAL METHOD AND APPARATUS FOR RIGHT-PROTECTED BROADCAST SERVICE" filed in the Korean Intellectual Property Office on Sep. 9, 2008 and assigned Serial No. 10-2008-0088874, the contents of which are incorporated herein by reference.

BACKGROUND

1. Technical Field

The present invention relates to a digital broadcast service and, in particular, to a Right Object renewal method capable of predicting the expiration of, and renewing, a Right Object prior to the predicated expiration of the Right Object.

2. Description of the Related Art

A digital broadcast receiver enables tuning to frequencies carrying digital broadcast signals. Typically, the digital broadcast signals are digitally encoded and modulated, and thus the broadcast receiver must demodulate and decode the received broadcast signals to present the received signals to a user or other type of equipment (e.g., a display system). In order to receive and process the received digital broadcast signals, a digital broadcast receiver includes a tuner, a broadcast data demodulator, and a broadcast data decoder. Recent digital broadcast systems are classified into a digital multimedia broadcast (DMB) system and a digital video broadcasting (DVB) system. These digital broadcast systems provide a plurality of service channels in a given frequency bandwidth, and each service channel carries broadcast program data and program information.

In case of DVB-Handheld (DVB-H) system, a service channel is multiplexed with audio/video data and supplementary program information. The audio/video data are transported using the Real Time Transport (RTP) protocol, and the program information is transported using the FLUTE protocol. The FLUTE protocol is built on top of the Asynchronous Layered Coding (ALC) protocol including a Layered Coding Transport (LCT) protocol. The FLUTE packets carry a File Delivery Table (FDT) and Object Data.

The DVB-H digital broadcast receiver can also be configured to support a Digital Right Management (DRM) for billing to a specific broadcast channel. In this case, the broadcast of the channel is provided to the subscribers having the right to use specific data content. The DRM can be implemented using various well-known right restriction methods, e.g. duration restriction and playback number restriction. With the widespread use of the mobile terminals and expectation of an increase of the broadcast-enabled mobile terminals, there is a need to develop a right protection method appropriate for the DVB-H service and efficiently managing the license issued for the right-protected broadcast channel.

SUMMARY

Accordingly, the present invention provides a right protection policy for the digital broadcast service, and a right object renewal method and apparatus for a right-protected broadcast channel that is capable of preventing the ongoing playback of the broadcast data from being broken due to the expiration of the license duration of the right object.

In accordance with an exemplary embodiment of the present invention, a method for renewing a right-protected broadcast service using a long term right object having a purchased license duration and a short term right object having a temporary license duration which is shorter than the purchased license duration includes determining whether the time to expiration of a previously issued short term right object is less than a predetermined threshold value; requesting, when the time to expiration of the previously issued short term right object is less than the threshold value, a server to issue a new short term right object; and renewing the temporary license duration using the new short term right object issued by the server.

In accordance with another exemplary embodiment of the present invention, an apparatus for renewing a right-protected broadcast service using a long term right object having a purchased license duration and a short term right object having a temporary license duration which is shorter than the purchased license duration includes a storage unit which stores the short term right object; a broadcast reception unit which receives broadcast data on a specific broadcast channel and decodes the broadcast data using the short term right object; a control unit which checks whether the time to expiration of a previously issued short term right object is less than a predetermined threshold value, requests, when the time to expiration of the previously issued short term right object is less than the threshold value, a server to issue a new short term right object, and renews the temporary license duration using the new short term right object issued by the server; and a radio frequency unit which establishes a communication channel with the server.

BRIEF DESCRIPTION OF THE DRAWINGS

The above and other objects, features and advantages of the present invention will be more apparent from the following detailed description in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The terms and words used in this specification and claims shall not be understood as limited to their lexical meaning. Based on the principle that an inventor can adequately define terms to best describe his/her invention, the terms and words shall be interpreted as conforming to the technical spirit of the present invention. Accordingly, the examples and drawings disclosed in the specification are only exemplary ones and there may be various equivalents and modifications at the time of the application for patent of this invention.

Although the right object renewal method and device is described in association with a DVB-H digital broadcast receiver in the following description, the present invention is not limited thereto. For instance, the right object renewal method and device of the present invention can be adopted to other broadcast standard-based broadcast receiver and broadcast-enabled mobile terminal supporting DRM.

In the following description, a specific broadcast channel can be protected with two types of right objects: a long term right object defining an entire duration of a right to access a specific broadcast channel which is purchased by the user and a short term right object which defines a unit duration for renewing the license for the access to the broadcast channel within a entire right duration.

Figure 1:
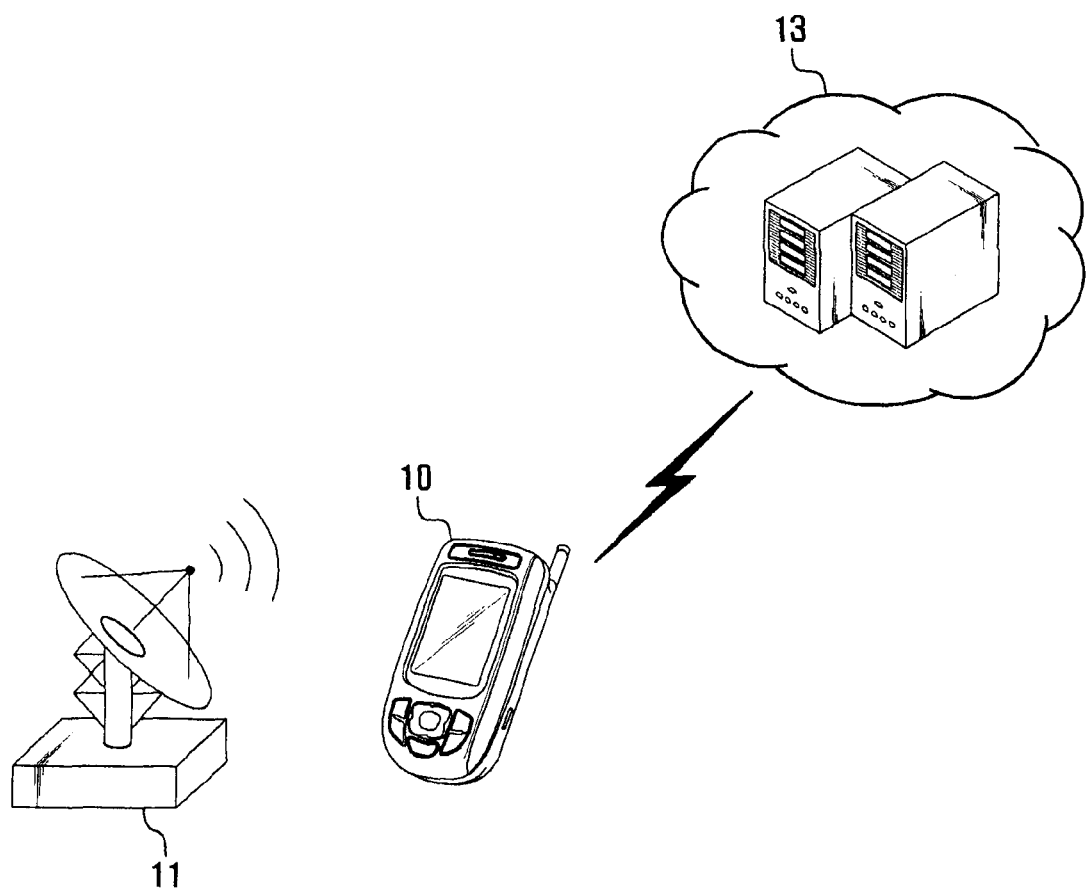
FIG. 1 is a schematic diagram illustrating a right object renewal system according to an exemplary embodiment of the present invention.

FIG. 1 is a schematic diagram illustrating a right object renewal system according to an exemplary embodiment of the present invention.

Referring to FIG. 1, the right object renewal system includes a broadcast station 11, a digital broadcast receiver 10, and a broadcast server 13. The broadcast server 13 can issue a short term right object for playing DRM-protected broadcast contents or include a right issuer server for issuing a partial right object. Note that short term means a partial right object, which is part of a long term right object. Although the digital broadcast receiver 10 is shown as a mobile or cellular telephone, it would be recognized that the digital broadcast receiver may be similar type receiving systems. For example, DVB-H receiving systems may also be smart phones such as IPHONE, CENTRO, and STORM or may be personal digital assistants (PDAa) or personal computers, such as desktop, laptop, Notebooks, etc. IPhone is a registered trademark of Apple Corporation. CENTRO is a registered trademark of the Palm Corporation and STORM is a registered trademark of the Blackberry Corporation.

In the above-structured right object renewal system, the digital broadcast receiver 10 stores a short term right object purchased by the user, checks the expiration date (time) of the short term right object while decoding the broadcast signal received on the broadcast channel by using the short term right object, and renews the short term right object or replaces the short term right object with a new short term right object prior to the expiration of the currently available short term right object. Here, the short term right object can be a part of a long term right object.

For instance, if the user purchases a long term right object permitting access to a specific broadcast channel for a license duration (e.g. 1 year), the broadcast server 13 divides the entire license duration in units of a predetermined duration (e.g. 1 month) and issues a short term right object permitting access to the broadcast channel to the digital broadcast receiver 10 every month. The digital broadcast receiver 10 checks the expiration of the short term right object and renews the short term right object by replacing the currently available (i.e., previously issued) short term right object with a new short term right object or extending the expiration time of the currently available short term right object automatically before the expiration of the short term right object. The digital broadcast receiver 10 can be configured to check the expiration of the short term right object in idle mode according to a preset checking schedule or in a background processing mode while other applications are running. The digital broadcast receiver 10 also can be configured to perform the validity inspection and the right object renewal processes in multi-processing mode without running an additional application program or breaking the ongoing broadcast playback. The digital broadcast receiver 10 also can be configured, even when the digital broadcast receiver 10 powers on to check the validity of the short term right object right after the mobile terminal completes its boot-up process and request the broadcast server 13 to send a new short term right object, if the currently available short term right object has expired or prior to its expiration.

The internal structures of the digital broadcast receiver 10 are described hereinafter in detail with reference to FIG. 2.

Figure 2:
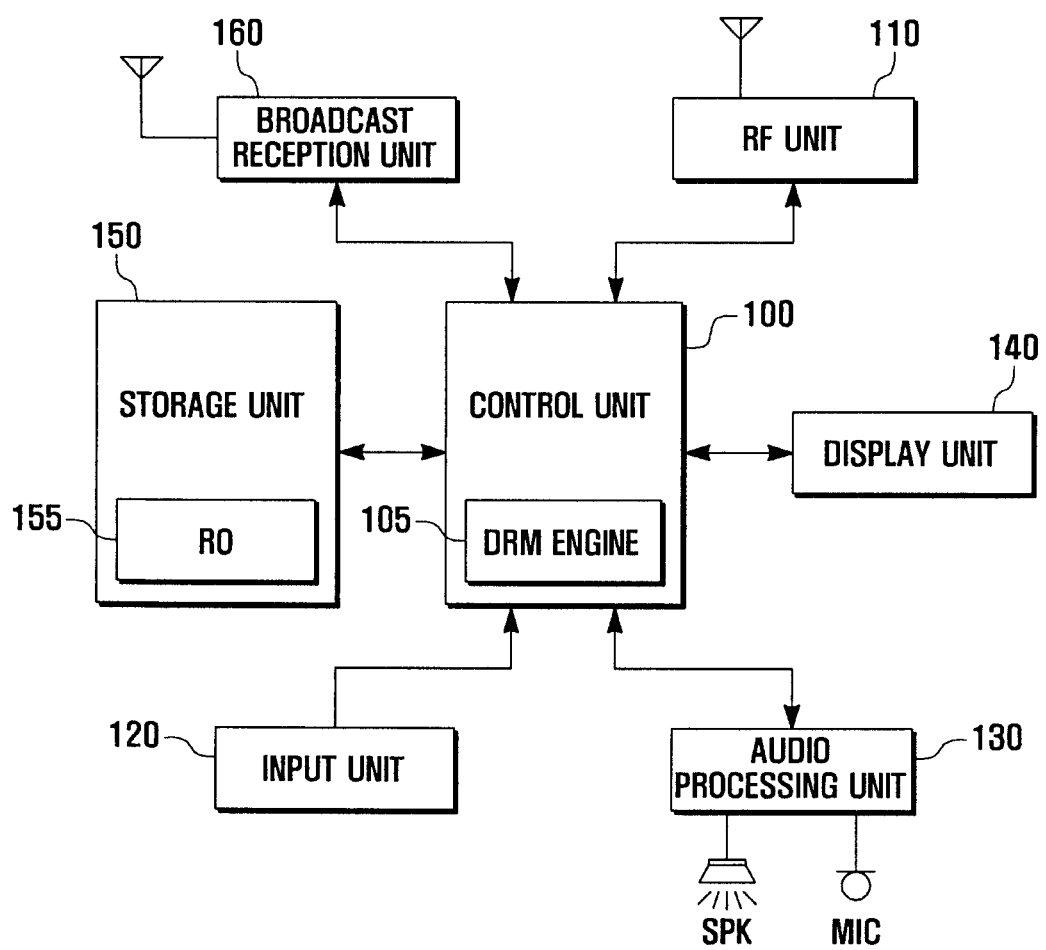
FIG. 2 is a block diagram illustrating a configuration of the digital broadcast receiver according to an exemplary embodiment of the present invention.

FIG. 2 is a block diagram illustrating a configuration of the digital broadcast receiver according to an exemplary embodiment of the present invention.

Referring to FIG. 2, the digital broadcast receiver 10 includes a Radio Frequency (RF) unit 110, an input unit 120, an audio processing unit 130, a display unit 140, a storage unit 150, a broadcast reception unit 160, and a control unit 100.

The digital broadcast receiver 10 receives the broadcast signals (not shown) by means of the broadcast reception unit 160 and decodes the broadcast data on the broadcast channel for which a short term Right Object (RO) is acquired. That is, once a short term RO for a specific broadcast channel is issued to the digital broadcast receiver 10 by the broadcast server 13 (FIG. 1), the digital broadcast receiver 10 can decode the broadcast signal received on the corresponding broadcast channel by using the short term RO such that the video and audio data decoded from the broadcast signal are output by means of the respective display unit 140 and the audio processing unit 130. The digital broadcast receiver 10 checks the validity of the short term RO stored in the storage unit 150 and, when the short term RO is determined to be valid, decodes the broadcast data received on the broadcast channel. In case that the short term RO is determined to be invalid, the digital broadcast receiver 10 requests the broadcast server 13 to provide a new short term RO. In order to prevent the interruption of the ongoing broadcast stream from, the digital broadcast receiver 10 checks the validity of the short term RO prior to the expiration of the currently available short term RO to provide sufficient time for renewing the short term right object. The operations of the internal function blocks of the digital broadcast receiver 10 are described hereinafter in detail.

The RF unit 110 is responsible for transmitting and receiving radio signals carrying the voice and data communications. The RF unit 110 is provided when the digital broadcast receiver 10 supports a radio communication function. The RF unit 110 includes an RF transmitter for up-converting and amplifying the transmission signal frequency and an RF receiver for low noise amplifying and down-converting the received signal frequency.

Particularly in an exemplary embodiment of the present invention, the RF unit 110 establishes a communication link with a server which issues the short term RO that allows permitting playback of DRM-protected content. That is, the RF unit 110 establishes a communication channel to access the server (e.g., unit 13, FIG. 1) at a predetermined time and requests the server to send a short term RO under the control of the control unit 100. The short term RO acquired from the server is delivered to the control unit 100. Although it is described that the digital broadcast receiver 10 accesses the server by means of the RF unit 110 in consideration of its mobility, the present invention is not limited thereto. For instance, the digital broadcast receiver 10 can further include a wire modem for establishing a wire connection to the server. Thus, the RF unit 110 can be replaced by a wire mode.

The input unit 120 is provided with a plurality of alphanumeric keys for receiving alphabetic and numeric data input by the user and a plurality of function keys for setting and executing various functions of the digital broadcast receiver 10. The function keys can be implemented in the forms of navigation keys, side keys, and shortcut keys. The input unit 120 can generate input signals for activating the broadcast reception unit 160, scanning broadcast channels, and selecting one of scanned broadcast channels in response to the user's key inputs, and outputs the input signals to the control unit 100.

The audio processing unit 130 is responsible for processing the audio data extracted from the broadcast data and outputs the audio data through a speaker (SPK) in the form of an audible sound wave. In case that the digital broadcast receiver 10 supports a cellular communication function, the audio processing unit 130 further includes a microphone for receiving the audio signal including voice.

The display unit 140 displays various operation status screens of the digital broadcast receiver 10. For instance, the display unit 140 can display a booting progress screen, an idle mode screen, menu screens, and broadcast application screen. The display unit 140 can be implemented with a Liquid Crystal Display (LCD) panel. In this case the display unit 140 can include an LCD controller, a video memory for buffering video data, and LCD devices. When the LCD supports a touch screen function, the display unit 140 can work as a part of the input unit 120.

Particularly in an exemplary embodiment of the present invention, the display unit 140 can be configured to display a menu screen presenting items or icons related to the broadcast reception unit 160, a channel list screen for displaying the broadcast channels scanned with the activation of the broadcast reception unit 160, and a broadcast data playback screen on which the decoded video data are displayed in the form of a visual image. When a broadcast channel which is DRM-protected is selected, the broadcast data received on the broadcast channel can be decoded t according a short term RO for the channel stored in the storage unit 150. If a short term RO is not stored in the storage unit 150, the broadcast data received is not decoded. Although the input unit 120, the audio processing unit 130 and the display unit 140 are depicted as individual peripheral components, it would be recognized by those skilled in the art that this representation is a logical representation and that the illustrated elements may be combined in one or more physical units that include one or more of the illustrated peripheral components.

The storage unit 150 stores application programs related to the functions and operations of the digital broadcast receiver 10 such as a digital broadcast reception application, a right object management application for requesting the server to send a short term RO, and a DRM engine for supporting RO-based content protection. The storage unit 150 can be configured to buffer the broadcast data received by means of the broadcast reception unit 160 in a predetermined data block (not shown). The storage unit 150 can be divided into a program region and a data region.

The program region stores at least an Operating System (OS) for booting up the digital broadcast receiver 10 and an application program for controlling the operations of the broadcast reception unit 160, an application program for controlling the RF unit 110 to acquire the short term RO, an application program for supporting the RO-based content protection, and an short term RO renewal application. The program region also stores the applications for supporting the supplementary functions of the digital broadcast receiver 10 such as camera function, audio playback function, and still and motion picture playback function.

The data region stores data generated while the digital broadcast receiver 10 is running the application programs, temporary data generated while receiving the broadcast data, and program information related to programs carried on the broadcast channels such as Electric Service Guide (ESG) and Electric Program Guide (EPG). The data region also stores the short term ROs. In case that a short term RO auto renewal program is running in the digital broadcast receiver 10, each short term RO is renewed at a predetermined interval. The broadcast reception unit 160 receives the broadcast signals transmitted by the broadcast station 11 and discriminates and processes the received broadcast signals according to corresponding processing procedures. That is, the broadcast reception unit 160 identifies the broadcast signals including broadcast service channel and supplementary broadcast information such as program channel guide channel, receives the broadcast channel with reference to the program guide, and extracts the broadcast data on the service channel. The broadcast reception unit 160 can be composed of a broadcast receiver 161, a protocol processor 163, and a decoder 165, as shown in FIG. 3.

Figure 3:
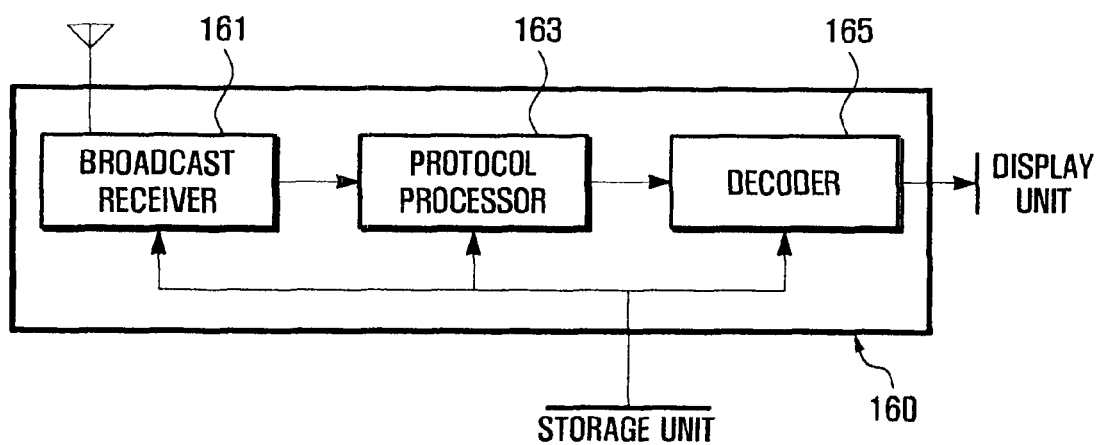
FIG. 3 is a block diagram illustrating the broadcast reception unit shown in FIG. 2.

FIG. 3 illustrates a block diagram of broadcast reception unit 160 shown in FIG. 2.

The broadcast receiver 161 receives broadcast data on the service channels selected by the user under the control of the control unit 100. The protocol processor 163 performs protocol processing on the broadcast data of the service channels to extract video data, audio data, and supplementary broadcast information (e.g. program guide). The decoder 165 includes an audio decoder, a video decoder, and a data processor (not shown). The audio decoder decodes the audio data extracted from the broadcast data. The video decoder decodes the video data extracted from the broadcast data. The decoded video and audio data are output through the display unit 140 and the speaker (SPK), respectively. The data processor decodes the supplementary broadcast information and, if required, updates the supplementary broadcast information.

Returning to FIG. 2, the control unit 100 controls power supplied to internal function blocks of the digital broadcast receiver 10 and signaling among the internal function blocks. In an exemplary embodiment, the control unit 100 activates the broadcast reception unit 160 in response to a user input and checks whether the broadcast channel selected by the user is DRM-protected. If the selected broadcast channel is DRM-protected, the control unit 100 retrieves the short term RO stored in the storage unit 150 and checks the validity of the short term RO. If it is determined that the short term RO is valid and associated with the DRM protected broadcast channel, the control unit 100 decodes the broadcast data on the selected broadcast channel by using the short term RO such that the video and audio data extracted from the broadcast data are output through the display unit 140 and the speaker (SPK), respectively. Here, the short term RO can be a license permitting the playing of the broadcast data on the broadcast for a predetermined duration within the entire duration defined by a long term right object. For instance, the long term RO can be a 1 year license for a broadcast channel of the Cable News Network (CNN), and the short term RO can be a 1 month license issued for the broadcast channel every month within the duration of 1 year. The user can access the server managed by the CNN by means of the digital broadcast receiver 10 to buy the long term RO. In this case, the digital broadcast receiver 10 receives and stores the short term RO at a predetermined interval (e.g. 1 month). The purpose using a short term RO in addition to the long term RO and renewing the short term RO periodically is to enhance security and protection of channel access right. In an exemplary case of monthly renewal policy in which the short term RO is renewed on the first day every month, the digital broadcast receiver 10 may download a new short term RO from the server on the first day of every month for normally accessing the corresponding broadcast channel. Otherwise, there can be a break of the broadcast stream in the short term RO renewal process on the first day of every month due to the processing delay caused by checking the validity of the short term RO, downloading a new short term RO, and verifying the downloaded shorter RO. In order to avoid a break or interruption of the ongoing broadcast stream due to the short term RO renewal process, the control unit 100 of the digital broadcast receiver 10 checks the validity of the short term RO at a predetermined time interval (preferably every hour) and, if the expiration of the short term RO is expected within a predetermined time, the control unit 100 makes a request to the broadcast server 13 for a new short term RO and downloads the new short term RO from the broadcast server 13 in a background processing mode. As a consequence, the control unit 100 updates the short term RO stored in the storage unit 150 with a new short term RO downloaded from the broadcast server 13.

For instance, the control unit 100 can be configured to check whether a current time is within a predetermined time, e.g., 24 hours of the expiration of the short term RO The short term RO expiration checking can be performed while the digital broadcast receiver 10 is processing the broadcast data on a specific broadcast channel. In this case, the control unit 100 of the digital broadcast receiver 10 activates the DRM engine 105 to verify the validity of the short term RO stored in the storage unit 150. During validity verification process, the control unit 100 can check whether the expiration of the short term RO is in the next 24 hours. If the expiration of the short term RO is within the next 24 hours, the control unit 100 switches on the RF unit 110 to establish a communication channel with the broadcast server 13. At this time, the control unit 100 can obtain the address of the broadcast server 13 from the short term RO stored in the storage unit 150. The control unit 100 can locate and access the broadcast server 13 with reference to the address obtained from the previously stored short term RO. After connecting to the broadcast server 13, the control unit 100 requests the broadcast server 13 to send a new short term RO or an updated expiration time of an issuing short term RO and replaces the previously stored short term RO with the new short term RO downloaded from the broadcast server 13. In order to request the broadcast server 13 to send the new short term RO, the digital broadcast receiver 10 sends a short term RO request message including device information on the digital broadcast receiver 10 to the broadcast server 13. Upon receipt of the short term RO request message, the broadcast server 13 identifies the digital broadcast receiver 10 with reference to the device information, checks the rights of the digital broadcast receiver 10, and issues a new short term RO in consideration of the rights of the digital broadcast receiver 10. At this time, the broadcast server 13 can request a right issuer server to issue a new short term RO and send the new short term RO issued by the right issuer server to the digital broadcast receiver 10. After the new short term RO is received, the control unit 100 of the digital broadcast receiver 10 replaces the previously stored short term RO with the new short term RO to renew the short term RO validity or update the expiration time of the previously issued short term RO.

The short term RO can be renewed in various manners. In an exemplary embodiment of the present invention, the control unit 100 checks the right duration indicated by the new short term RO received from the broadcast server 13 and extends the expiration time (and date) of the previously stored short RO. For instance, when the new short term RO received from the broadcast server 13 has a duration starting on July 1 and ending on July 31, the control unit 100 may extend the right duration of the previously stored short term RO which has started on June 1 and ends on June 30 such that the right duration of the renewed short term RO starting from the June 1 is extended to July 31.

Alternatively, the control unit 100 can renew the short term RO by replacing the previously issued short term RO with a newly issued short term RO. For instance, if the license duration of the short term RO is between June 1 and June 30, the control unit 100 checks the validity of the short term RO and determines on June 29 whether the time to expiration of the short term RO is less than 24 hours. In this case, the control unit 100 accesses the broadcast server 13 and requests the broadcast server 13 to send a new short term RO on June 29, whereby the broadcast server 13 sends a new short term RO having the license duration between June 29 and July 29 to the digital broadcast receiver 10 and, as a consequence, the control unit 100 of the digital broadcast receiver 10 renews the short term RO with the license duration between June 29 and July 29. At this time, the control unit 100 of the digital broadcast receiver 10 can nullify the remained license duration of the previously issued short term RO and applies the license duration of the newly issued short term RO. Alternatively, the control unit 100 can wait for the expiration of the currently available short term RO and a short time prior to the expiration of the currently available short term RO switch to the newly available short term RO.

Upon receipt of the short term RO request message, the broadcast server 13 refers to the device information contained in the short term RO request message and retrieves the information regarding the long term right object issued to the digital broadcast receiver 10 based on the device information. That is, the broadcast server 13 checks the expiration of the long term RO issued for the digital broadcast receiver 10 and issues a new short term RO or an extension of time of the currently available short term RO in consideration of the remaining time up to the expiration of the long term RO. For instance, when the expiration of the long term RO issued to the digital broadcast receiver 10 for a specific broadcast channel is August 30 and today is August 15, the broadcast server 13 can issue a new short term RO having a right duration between August 15 and August 30 despite the monthly short term RO renewal policy.

In the case, the short term RO has a license duration shorter than a month (i.e., a predetermined time period), the control unit 100 of the digital broadcast receiver 10 may determine that the expiration of the long term RO is approaching within the predetermined update time and outputs an alert regarding the expiration of the long term RO such that the user may determine whether to extend the long term RO. Alternatively, if a long term RO expiry message is received from the broadcast server 13 in response to the short term RO request message, the digital broadcast receiver 10 outputs an alert message informing the user of the pending expiration of the long term RO such that the user can purchase a new long term RO or extend the existing long term RO, as necessary.

Until now, the structures of the right object renewal system and operations of the right object renewal system for renewing the short term RO have been described. A right object renewal method according to an exemplary embodiment of the present invention is described hereinafter with reference to accompanying drawings.

Figure 4:
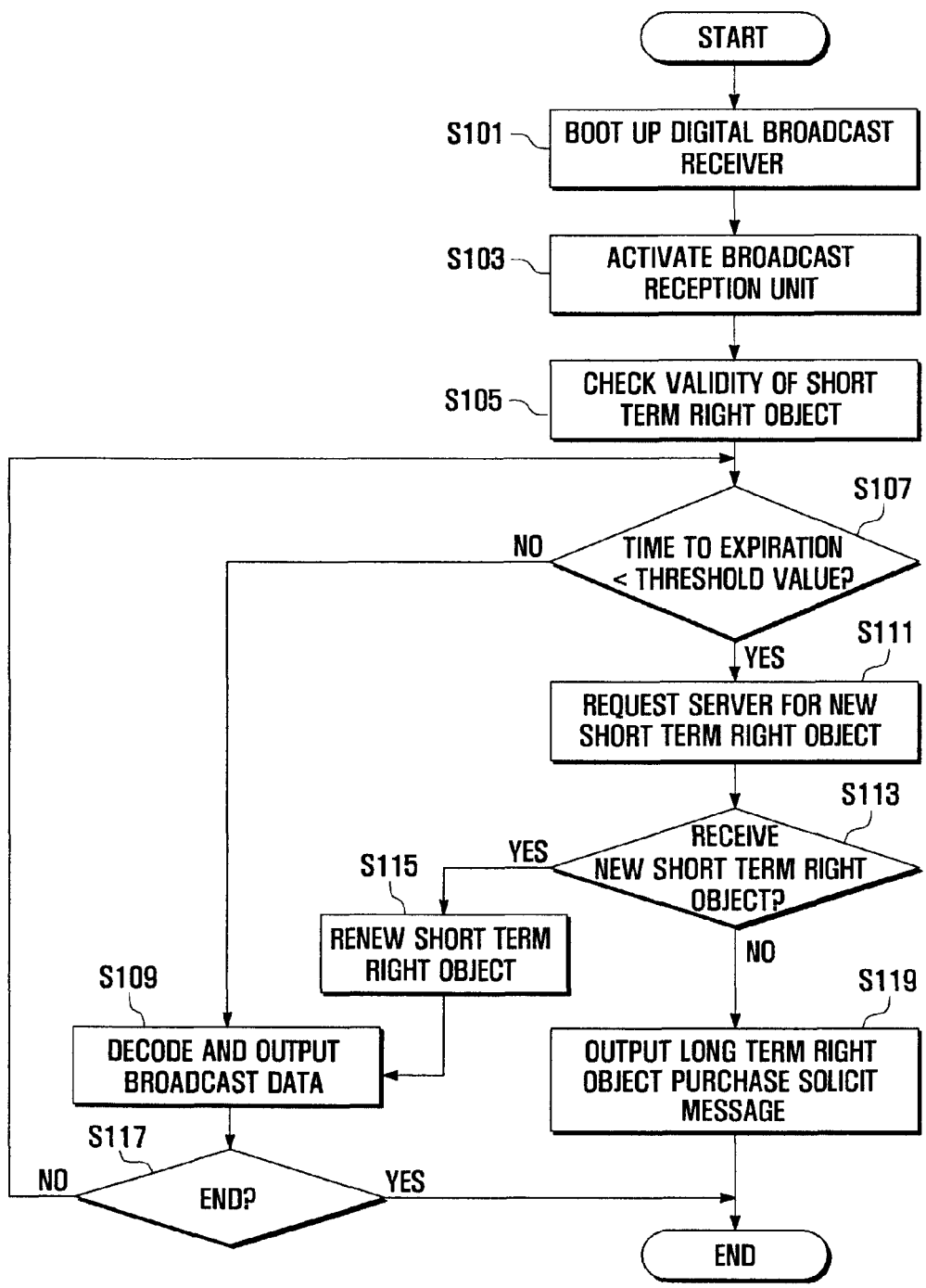
FIG. 4 is a flowchart illustrating a right object renewal method for a digital broadcast service according to an exemplary embodiment of the present invention.

FIG. 4 is a flowchart illustrating a right object renewal method for a digital broadcast service according to an exemplary embodiment of the present invention.

Referring to FIG. 4, the digital broadcast receiver 10 boots-up at power-on (101). After the broadcast receiver 10 has successfully booted-up and is operational, the control unit 100 of the broadcast receiver 10 activates the broadcast reception unit 160 in response to a user command (103). At this time, the control unit 100 displays a menu screen on the display unit 140 for the user to activate the broadcast reception unit 160 by selecting a menu item or icon.

Once the broadcast reception unit 160 is activated, the control unit 100 checks the validity of the short term RO issued to the digital broadcast receiver 10 for the broadcast channel selected by the user (105). In more detail, the control unit 100 searches the storage unit 150 for a short term RO issued for the broadcast channel and, if a short term RO issued for the broadcast channel is retrieved, checks the validity of the retrieved short term RO. After activating the broadcast reception unit 160 at step 103, the right object validity verification step 105 is performed when the broadcast channel selected by the user is a DRM-protected channel which requires a short term RO for decoding the broadcast data on the broadcast channel. This means that there can be license-free broadcast channels that do not require right objects to decode the broadcast data. Accordingly, when a broadcast channel is selected by the user, the control unit 100 of the digital broadcast receiver 10 determines whether the selected channel is DRM-protected. If the selected channel is DRM protected, the control unit 100 searches the storage unit 150 for the short term RO issued for decoding the broadcast data on the selected broadcast channel. Once the short term RO is retrieved, the control unit 100 verifies the validity of the short term RO.

After verifying the validity of the short term RO, the control unit 100 determines whether the time to expiration of the short term RO is less than a predetermined threshold value, e.g. 24 hours (107). If the time to expiration of the short term RO is equal to or greater than the threshold value, the control unit 100 starts decoding the broadcast data on the selected broadcast channel by using the short term RO and outputs the decoded video and audio data to the display unit 140 and the audio processing unit 130 respectively (109).

Otherwise, if the time to expiration of the short term RO is less than the threshold value, the control unit 100 sends a short term RO request message to the broadcast server 13 requesting a new short term RO. For this purpose, the control unit 100 of the digital broadcast receiver 10 establishes a communication channel with the broadcast server 13 by means of the RF unit 110. At this time, the control unit 100 can establish a wired communication channel with the broadcast server 13 by means of a wire modem.

Next, the control unit 100 waits for receiving a new short term RO in response to the short term RO request message (113). If a new short term RO is received, the control unit 100 renews the previously stored short term RO with the new short term RO (115) and starts decoding the broadcast data on the selected broadcast and outputs the decoded video and audio data to the display unit 140 and the audio processing unit 130 respectively (109). Step 109 can be performed regardless of the short term RO renewal steps. That is, the control unit 100 retrieves a short term RO required for decoding the broadcast data on the broadcast channel selected by the user, releases the DRM protection on the broadcast channel using the short term RO, decodes the broadcast data on the broadcast channel, and outputs the video and audio data decoded from the broadcast data to the display unit 140 and the audio processing unit 130. In case that the time to expiry of the short term RO is less than the threshold value, the control unit 100 performs steps 111, 113, and 115 in a background processing mode to prevent the ongoing broadcast stream from being interrupted. While the digital broadcast receiver 10 plays the video and audio data, the control unit 100 monitors the input device to detect a broadcast playback termination command input by the user (117). If no broadcast playback termination command is detected, the process goes to step 107.

As noted above, the time-to-expiration checking step can be performed at a predetermined time interval. For instance, the control unit 100 can perform the time-to-expiration checking steps periodically, e.g. every hour. In another aspect, the time to expiration may be checked periodically, e.g., every hour, after a predetermined time after the start of the current short term RO. That is, assuming a short term RO duration of one month, then the time to expiration check may begin 29 days after the start of the short term RO and then performed periodically (e.g., every hour) thereafter. That is, the expiration of the short term RO may be checked once on a daily basis (i.e., a first periodic basis), and then hourly (i.e., a second periodic basis) after a predetermined number of days has occurred. In this case, the request for a new short term RO may be performed after a predetermined number of hours after a predetermined number of days have elapsed since the last update of the short term RO.

As described above, the short term RO renewal at step 115 can be performed by replacing the previously stored short term RO with a new short term RO or extend the expiration of the previously stored short term RO to the expiration of the new short term RO.

Returning to step 113, if no short term RO but a RO purchase solicit message is received, the control unit 100 outputs an alert message notifying the user that the expiration of a long term RO is approaching and a new long term RO purchase is required (119). For this purpose, the broadcast server 13 checks the information on the long term RO issued to the digital broadcast receiver 10 and sends a new short term RO message when the time to expiration of the long term RO is equal to or greater than a predetermined threshold value or a long term RO purchase solicit message when the time to expiration of the long term RO is less than the predetermined threshold value.

As described above, the right object renewal method for a broadcast service checks the time to the expiration of the short term RO for decoding the broadcast data on a specific broadcast channel and automatically renews the short term RO at a predetermined time before the expiration of the short term RO, thereby preventing the ongoing broadcast stream from being interrupted due to the expiration of the short term RO.

Figure 5:
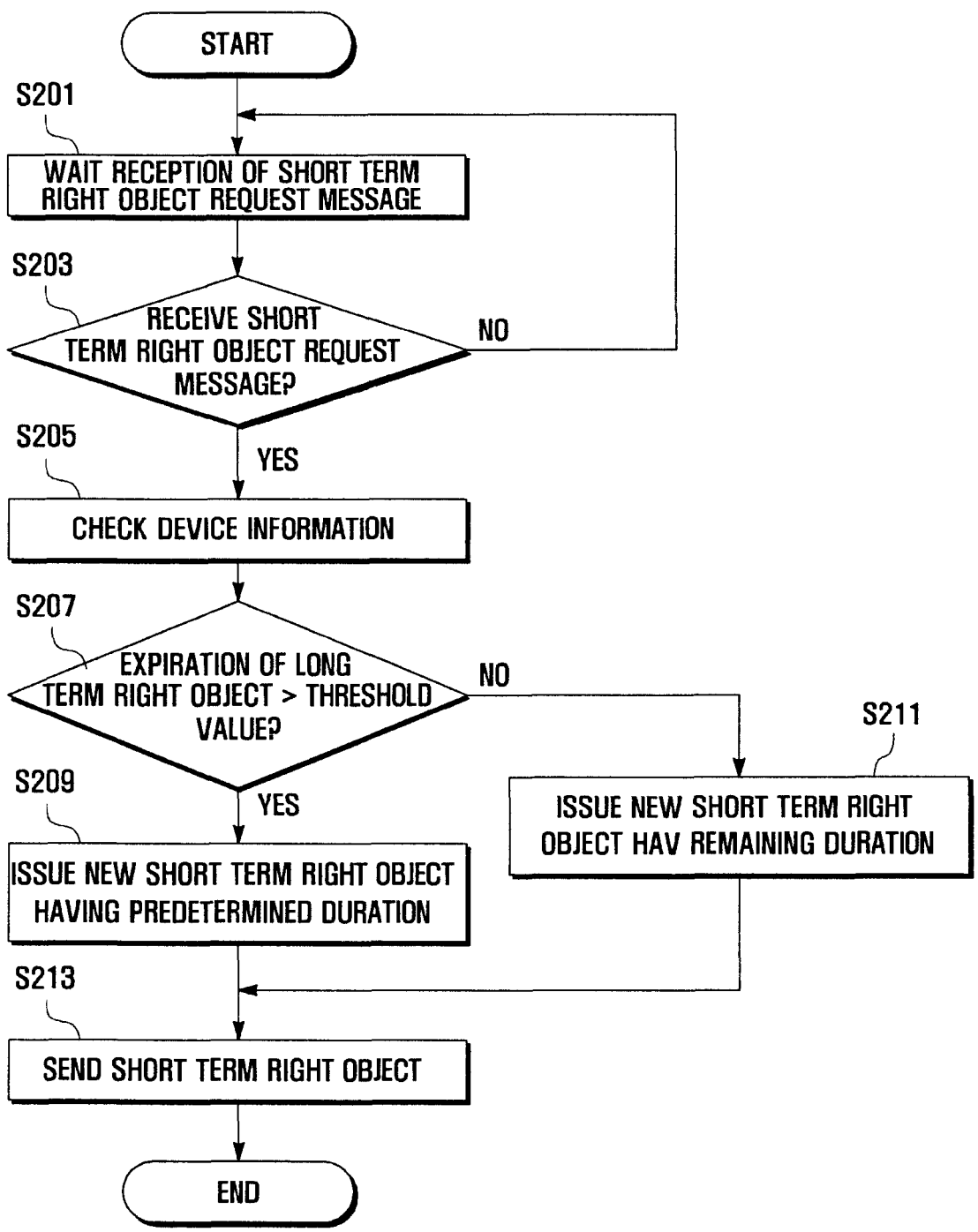
FIG. 5 is a flowchart illustrating a right object renewal method of FIG. 4 in view of a broadcast server.

FIG. 5 is a flowchart illustrating a right object renewal method of FIG. 4 in view of the broadcast server 13.

Referring to FIG. 5, the broadcast server 13 monitors the received signals for a short term RO request message (201) and determines whether a short term RO request message is received (203). If a short term RO request message is received, the broadcast server 13 checks the device information contained in the short term RO request message to identify the digital broadcast receiver 10. The device information can include a phone number or other unique identification assigned to the digital broadcast receiver 10.

After identifying the digital broadcast receiver 10, the broadcast server 13 determines whether the time to expiration of the long term RO issued to the digital broadcast receiver 10 is greater than a predetermined threshold value (207). For instance, assuming that the license duration of the long term RO is 1 year and the short term RO defined as a part of the license duration of the long term RO is renewed monthly and the time to the expiration of the long term RO is 40 days, the time to the expiration of the long term RO is greater than a threshold value of 30 days. If, on the other hand, the time to expiration of the long term RO is 20 days, then the time to expiration of the long term RO is less than the threshold value of 30 days.

If it is determined that the time to expiration of the long term RO is greater than the threshold value, the broadcast server 13 issues a new short term RO having a license duration of 1 month (e.g., 30 days) (209) and sends the new short term RO to the digital broadcast receiver 10 in response to the short term RO request message (213).

Otherwise, if the time to expiration of the long term RO is not greater than the threshold value, the broadcast server 13 issues a new short term RO having a license duration shorter than the predetermined time (e.g., one month) due to the remained license duration of the long term RO (211) and sends the new short term RO to the digital broadcast receiver 10 in response to the short term RO request message (213). For instance, if the long term RO expires on August 25 and the short term RO request message is transmitted on August 15, the broadcast server 13 issues a new short term RO having a license duration between August 15 and August 25. In case that the license duration of the new short term RO is less than the predetermined time (e.g., one month) or the license duration of the long term RO has expired, the broadcast server 13 can generate an RO purchase solicit message at step 211 and sends the RO purchase solicit message to the digital broadcast receiver 10. The digital broadcast receiver 10, after receiving the RO purchase solicit message, displays an alert message notifying of the potential expiration of the long term RO on the display unit 140 such that the user can determine whether to repurchase the long term RO.

As described above, the right object renewal method and apparatus of the present invention is advantageous to maintain the ongoing playback of the broadcast data on the DRM-protected broadcast channel in view of a predicted expiration of the license duration without the user being aware of the potential license expiration.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of a service receiver device renewing a service which is right-protected, the method comprising:
   in the service receiver device:
   obtaining an issued short term right object associated with a long term right object for the service, the issued short term right object having a license duration that is shorter than that of the long term right object and is a part of an entire license duration defined by the long term right object for the service;
   checking whether an expiration time of the issued short term right object is less than a threshold value;
   requesting, if the expiration time of the issued short term right object is less than the threshold value, a server to issue a new short term right object;
   receiving the new short term right object issued and transmitted by the server over a communications network, the new short term right object having a license duration that is shorter than that of the long term right object and is a part of an entire license duration defined by the long term right object for the service; and
   renewing the license duration using the new short term right object.

2. The method of claim 1, wherein renewing the license duration comprises:
   extracting a license duration of the new short term right object; and
   extending the license duration of a previously issued short term right object using the license duration of the new short term right object.

3. The method of claim 1, wherein renewing the license duration comprises replacing a previously issued short term right object with the new short term right object.

4. The method of claim 3, wherein the new short term right object is a right object defining a license duration selected from one of: starting from a date determined by the server and a date on which the new short term right object is received.

5. The method of claim 1, further comprising:
   receiving an expiration notification message transmitted by the server, the expiration notification message providing information regarding an expiration of the long term right object; and
   outputting an alert message regarding said expiration of the long term right object.

6. An apparatus renewing a service which is right-protected, the apparatus comprising:
   a control unit including a processor executing instructions, the control unit configured to obtain an issued short term right object associated with a long term right object for the service, the issued short term right object having a license duration that is shorter than that of the long term right object and is a part of an entire license duration defined by the long term right object for the service;
   a storage unit which stores the issued short term right object;
   a reception unit which receives data of the service and decodes the data using the issued short term right object; and
   a radio frequency unit which establishes a communication channel with a server and receives a new short term right object from the server;
   wherein the control unit is further configured to:
   check whether an expiration time of the issued short term right object is less than a threshold value,
   request, if the expiration time of the issued short term right object is less than the threshold value, a server to issue a new short term right object, the new short term right object having a license duration that is shorter than that of the long term right object and is a part of an entire license duration defined by the long term right object for the service, and
   renew the license duration using the new short term right object.

7. The apparatus of claim 6, wherein the control unit extracts a license duration of the new short term right object and extends the license duration of a previously issued short term right object using the license duration of the new short term right object.

8. The apparatus of claim 6, wherein the control unit replaces a previously issued short term right object with the new short term right object.

9. The apparatus of claim 8, wherein the new short term right object is a right object defining a license duration selected from one of: starting from a date determined by the server or a date on which the new short term right object is received.

10. The apparatus of claim 6, wherein the control unit receives an expiration notification message transmitted by the server, the expiration notification message providing information regarding expiration of the long term right object and outputs an alert message regarding the expiration of the long term right object.

* * * * *